(No Model.) 2 Sheets—Sheet 2.
E. THOMSON.
ELECTRIC MEASURING INSTRUMENT.
No. 502,022. Patented July 25, 1893.
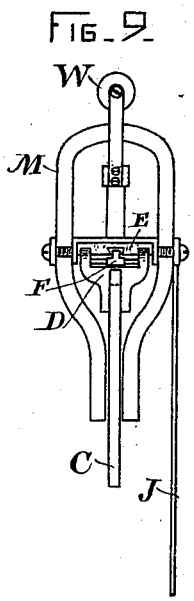
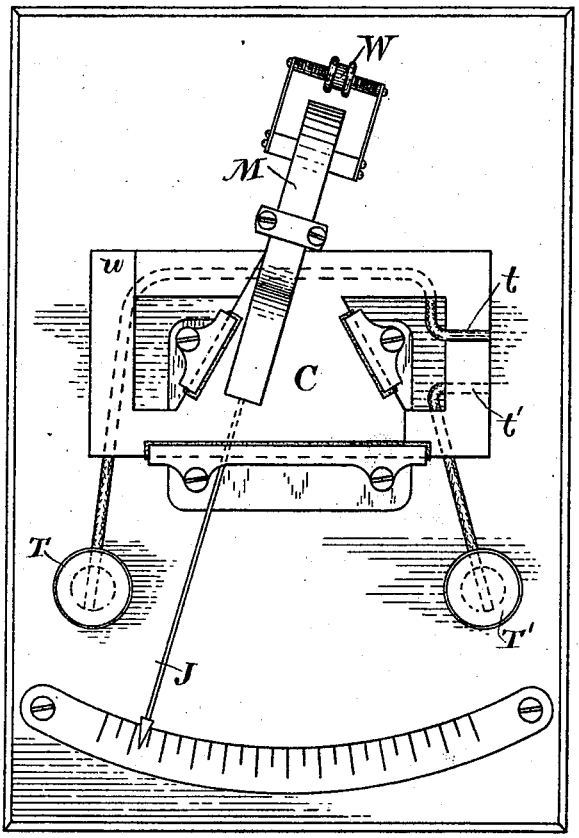
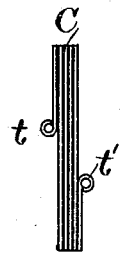
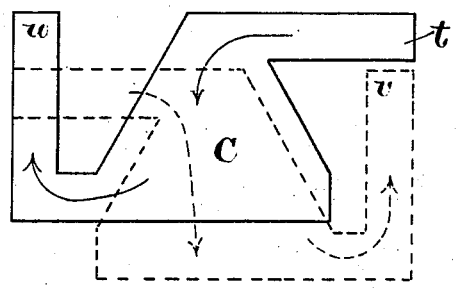
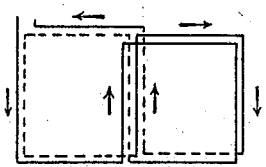
WITNESSES—
Alec F. Macdonald.
T. J. Johnston.
INVENTOR—
Elihu Thomson
by Bentley and Blodgett.
Attys.

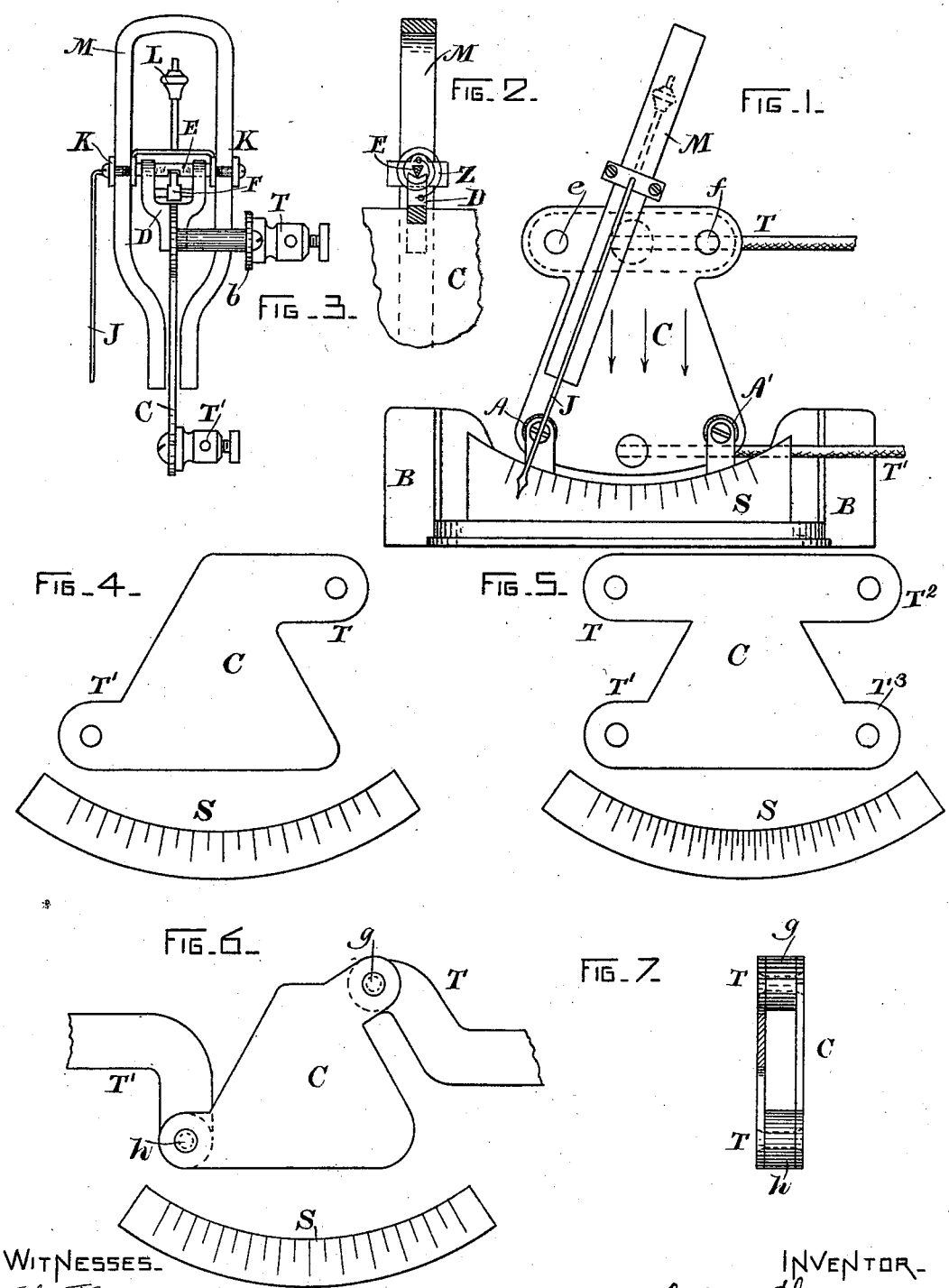

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

ELECTRIC MEASURING-INSTRUMENT.

SPECIFICATION forming part of Letters Patent No. 502,022, dated July 25, 1893.

Application filed February 17, 1893. Serial No. 462,795. (No model.)

*To all whom it may concern:*

Be it known that I, ELIHU THOMSON, a citizen of the United States, residing at Swampscott, in the county of Essex and State of Massachusetts, have invented certain new and useful Improvements in Electric Measuring-Instruments, of which the following is a specification.

My invention relates to an electric measuring instrument, and provides a simple and reliable instrument for the measurement of continuous currents. To this end, I utilize as a moving part a permanent magnet, the poles of which are closely approximated while between them is situated a stationary plate of copper, or other good conducting material, which is traversed by the current to be measured, in a direction transverse to the field magnet poles. The plates which convey the current are at the same time adapted to "damp" the oscillations of the magnet, so that the instrument becomes thoroughly "dead-beat."

In the accompanying drawings hereby referred to and made part of this specification in which like letters of reference indicate like parts, I have illustrated an embodiment of my invention; and in them Figure 1 is a front elevation. Fig. 2 is a side elevation of a detail, and Fig. 3 a side elevation of an instrument embodying my invention. Figs. 4, 5 and 6 are views of modified forms of the conducting plate affording varied scale readings. Fig. 7 is a side view of the parts shown in Fig. 6, the scale being omitted. Fig. 8 is a front elevation, and Fig. 9 a side elevation of a modified form of the instrument, designed to measure current and indicate its direction at the same time. Figs. 10 and 11 are views of the plates used in the modified form, and Fig. 12 is a diagram of the course of the current in the plates shown in Figs. 10 and 11.

Mounted on a vertical base plate B by standards insulated at A A', is a flat plate of copper C, connected to wires T T', whereby a current may be caused to traverse the plate C in an approximately vertical direction, as indicated by the arrows on the plate. Spanning this plate, with poles closely adjacent to its sides, is a magnet M of hardened steel, made as permanent as possible, the bend of the magnet being at the top and the closely spanning poles being at the lower part, as shown more clearly in Fig. 3, where C is the conducting plate, as before, T' the lower terminal, and T the upper current terminal of the plate. The current from T is led by a bridge piece *b* at the back into the two upper corners of the plate C at *e, f,* Fig. 1.

Attached to the upper edge of the plate, preferably, although such attachment may be made to any other stationary portion of the apparatus, is a bearing D, in Fig. 2, for a knife edge E, secured to the magnet between its limbs by proper clamps, K K. These clamps K K carrying the knife edge E also carry the index or pointer J, which, in Fig. 1, traverses the scale S from left to right.

At the center of the knife edge a portion is cut away for a small piece F which is attached to the support D and forms a thrust-bearing, serving to keep the magnet M clear of contact at its poles with the plate C. An adjustable counterpoise L may be provided to set the center of gravity of the structure at the proper distance below the edge of the knife edge. It will be seen from the arrangement that the magnet M is free to swing and carry the pointer or index J from right to left in Fig. 1. The pointer is, however, steadied by being attached to the magnet M, which has a field of some intensity and passes adjacent to the conductor plate C; thus the magnet, when set into vibration as a pendulum, at once comes to rest. The counterpoising of the magnet is such that the center of gravity is just below and a little to one side of the knife edge, so that in the normal position it stands about as in Fig. 1. It may, however, be so hung that it normally stands vertical, in which case it becomes an indicator not only of the strength of the current but also of the direction, its movement being to the right or to the left in accordance with the direction of the current through the conductor plate C. Instead of relying upon the gravitational effects, the deflecting action may be, either in whole or in part against the power of a spring, one end of which is attached to the moving structure and the other end to the fixed support, as indicated in Fig. 2 where Z is such a spring. In any case the passage of current by the terminal wires or connections T T' through the conducting plate C will have the direction which is proper to cause a deflection of the magnet M, Fig. 1, such that the index J traverses the scale from left to right in that figure, and to a distance which may be according to the loading, which may be greater or less. If the apparatus be set so as to be very sensitive, that is, to have its center of gravity very close to the point of support, a large deflection for a given current will be obtained. If, on the other hand, its center of gravity be at some distance below its point of support, a larger current will be required to produce any considerable deflection. The center of gravity may be raised or lowered by moving the weight L up and down on its stem. The apparatus thus shown will give an approximate, though not an absolute, uniformity of deflection for equal increments of current, and furnishes a very simple type of "dead-beat" ammeter, not subject to continued oscillations when care has been taken in the construction of the magnet M, and the "seasoning" thereof has been such as to leave it practically unchanging by time.

The particular kind of scale for this instrument will depend on the points at which current is passed into and out of the plate C. Thus, in Fig. 4, passage of current from the part T to T', if the magnetism of the magnet be in the right direction, will give a deflection of a magnet and index arranged as in Fig. 1 over the scale S which will be approximately proportional to current strengths, or nearly uniform in its deflection per unit of current strength. In general the indications for given strengths will be a little closer near the middle of the scale than at or near its ends, it being assumed that in no case do the poles of the magnet pass off the face of the conducting plate. With the magnet, index, and a scale beginning at the left arranged as in Fig. 1 applied to a plate C such as is shown in Fig. 5, if current be passed in at point T and out at T' the deflections for small currents will be greater as the magnet moves from left to right than for large currents; and the scale divisions will be spaced farther apart at the beginning than at the end of the index-swing. This effect would be reversed if the current be passed between $T^2$ and $T^3$ with the magnet arranged as before.

In Figs. 6 and 7 another arrangement of the conducting plate C is shown, where it is offset from the terminals T T' on studs, as at $g\ h$, leaving the plate C in a more convenient position for adjustment of the relations of the moving magnet.

Where it is desired that instead of the single passage of current in the plate between the poles of the magnet, there shall be a multiplied effect due to its repeated passage, an arrangement such as is shown in Figs. 8 to 12, inclusive, may be adopted. The magnet M is mounted as before except that it is provided with a metallic frame carrying a screw and an adjustable weight, W, for adjusting its center of gravity. The supports of the magnet are in knife edges, as before, and the field embraces plate C, which in this case instead of being single, is constructed of several layers or laminæ insulated from each other and clamped together to form one structure. The blanks from which the part C is made are shown separately in Fig. 11; several of these are coupled up one back of another to form a continuous circuit in which the current flow is practically as represented in Fig. 12. Each plate has a trapezoidal body with tongues extending from it for the terminals; and this is substantially the shape of all the plates herein referred to. The current entering from the terminal T, Fig. 8, would pass into the first plate or front plate at $t$ shown in edge view, Fig. 10. It then from $t$ passes forward to the left and down through the middle or triangular portion of the plate C, as indicated in Fig. 11, and thence upward through the portion $u$, which connects with a tongue or extension of a similar blank reversed, shown in dotted lines displaced downward to more clearly show the construction. The current from the first plate thus enters the second plate and passes between the magnet poles as before outward and upward through the part $v$, Fig. 11, which is again connected to an entering terminal like the first plate; and so the connections are continued until all the plates of the series are traversed, the current leaving on the last tongue of the last plate at $t'$ Fig. 10 (shown in dotted lines in Fig. 8), connected to the outgoing terminal T'. The current in its traverse practically makes a figure 8 and moves in an S-shaped direction in each plate, as indicated in Fig. 12 by arrows; entering at the left hand upper corner of the figure on the solid line, the current passes down on that line, to the right on the solid line at the bottom of the figure, up on the solid line to the left of the center, to the right on the lower solid line at the top of the right hand part of the figure, down on the inner solid line at the right hand side of the figure, to the left on the bottom solid line, up on the left hand dotted line in the center of the figure, then down the dotted lines to the bottom of the right hand solid line in the center of the figure, thence passing as finally indicated by the arrows out again at the left hand upper corner of the figure. This multiplies its effect and allows a number of convolutions to affect the deflection. It will further be observed that the currents pass in a substantially vertical direction through the bodies of the plates C assisting to compound their effect. The plates C on account of their extent between the poles of the magnet act to allow generation of currents on a movement of the magnet and give a "damping" action, as obtained in the apparatus illustrated in the previous figures.

It is manifest that changes may be made in the arrangements described without varying from my invention; for instance the magnet might be hung at the bottom of the plate instead of the top, being suitably counterpoised; or it might be hung horizontally. For any of the arrangements thus shown an adjustment of the indexes may be had by varying the course of the current through the plate. Taking for illustration Fig. 5 of the drawings, the current might be passed, as explained in this specification, from T to T' giving an increased value to the scale readings on the left, or from $T^2$ to $T^3$ giving such an increase to the scale readings on the right, or the terminals T $T^2$ and T' $T^3$ may be connected by bridges when the current will pass approximately vertically and the scale parts will have equal value. As this may be made an important means of adjusting the instrument to the purpose required, I desire especially to cover it in this application.

I am aware of the patent to Madison M. Garver, No. 425,069 dated April 8, 1890, wherein a construction in some respects similar to the one I have adopted is used; but the instrument there shown employs the astatic principle of balanced magnetisms and differs essentially in principle from the one I prefer. I do not therefore wish to claim anything shown in that patent, but

What I claim, and desire to protect by Letters Patent of the United States, is—

1. An electric measuring instrument composed of a single balanced horse-shoe magnet with its poles closely approximated and a plate interposed between the poles of the magnet, the plate conducting the current to be measured at an approximate right angle to the field of the magnet, substantially as described.

2. An electric measuring instrument composed of a single vertically suspended horse-shoe magnet with its poles closely approximated and a plate interposed between them, the plate conducting the current to be measured through the field of the magnet, substantially as set forth.

3. An electric measuring instrument composed of a single oscillating horse-shoe magnet having its poles closely approximated, and a plate interposed between them; the plate conducting the current through the field of the magnet, substantially as described.

4. In an electric measuring instrument, the combination of a single oscillating magnet having its poles closely approximated and a plate interposed between them conducting the current to be measured at an approximate right angle to the field of the magnet; the magnet being provided with an adjustable counterpoise, whereby its angular displacement may be varied, substantially as set forth.

5. In an electric measuring instrument the combination of an oscillating magnet, as described, with a plate conducting the current to be measured between its poles, as herein set out; the magnet provided with a knife edged bearing having a thrust-check preventing its longitudinal movement and the contact of the magnet with the plate, substantially as described.

6. In an electric measuring instrument a conducting and "damping" plate consisting of a trapezoidal body and tongues extending therefrom connecting with the circuit terminals, substantially as set forth.

7. In an electric measuring instrument the combination of a single oscillating magnet, as described, with a conducting and "damping" plate placed between its poles and carrying the current to be measured; the plate being formed with a trapezoidal body and tongues extending therefrom connecting with the circuit terminals, whereby the current is caused to flow at an approximate right angle to the field of the magnet, substantially as described.

8. In an electric measuring instrument the combination of a single oscillating horse-shoe magnet having its poles closely approximate and mounted upon an arbor having knife edged bearings and a thrust check, and a plate interposed between the poles of the magnet and formed with a trapezoidal body and tongues extending therefrom to the circuit terminals, substantially as set forth.

9. In an electric measuring instrument the combination with a base plate, as B B, of a plate, as C, carrying the current between suitable terminals, as T T', and a vibrating horse-shoe magnet, as M, provided with an index, as I, reciprocating upon a scale, as S; the magnet being counterpoised by suitable means, as L, and having its poles closely approximated to the plate, substantially as described.

10. In an electric measuring instrument an oscillating magnet, as described, in combination with a plate interposed between its poles and carrying the current to be measured; the plate composed of laminæ in series insulated from one another, all carrying current adjacent to the magnet poles in substantially the same direction, substantially as set forth.

11. In an electric measuring instrument an oscillating magnet, as described, in combination with a plate formed with a trapezoidal body and tongues extended to connect with adjacent plates of a similar shape and reversed in position, and thereby making connection with the circuit terminals, the plates carrying the current to be measured and composed of laminæ in series insulated from one another, substantially as described.

12. In an electric measuring instrument composed of an oscillating magnet carrying an index and a stationary plate between its poles conducting the current to be measured, the method of adjusting the index readings which consists in varying the course of the current through the plate relative to the magnetic field, substantially as set forth.

13. In an electric meter or measuring instrument a suspended horseshoe magnet or its equivalent with its poles closely approximated to the opposite sides of a plate or plates interposed between said poles, means for passing current through the plate in a direction from or toward the pivot of the suspended magnet, the center of gravity of such magnet being arranged with respect to its pivot so as to cause the poles of the magnet at rest, and without current flowing in the plate, to lie near the edge or side of the conducting and damping plate, as described.

14. The combination in an electric meter or measuring instrument of a stationary damping and conducting disk or plate, traversed by the currents to be measured, and which currents flow in a direction from or toward a pivot for a magnet, a magnet mounted on the pivot at or near the edge of the disk or plate, and whose poles embrace or pass over in proximity to said disk or plate without touching the same, and an index actuated by said magnet.

15. In an electric measuring instrument a damping and conducting plate through which the currents to be measured are passed, a horseshoe magnet having expanded pole areas embracing said plate and pivoted at or near the center of gravity of the magnet, whereby it is suspended and free to move in planes parallel with the plate, and an index or scale for indicating the movements.

In witness whereof I have hereunto set my hand this 10th day of February, 1893.

ELIHU THOMSON.

Witnesses:
JOHN W. GIBBONEY,
BENJAMIN B. HULL.